(12) United States Patent
Sueoka

(10) Patent No.: US 10,350,797 B2
(45) Date of Patent: Jul. 16, 2019

(54) METHOD FOR MANUFACTURING A SANDWICH PANEL

(71) Applicant: Kyoraku Co., Ltd., Kyoto-Shi, Kyoto (JP)

(72) Inventor: Masaaki Sueoka, Tokyo (JP)

(73) Assignee: Kyoraku Co., Ltd., Kyoto-Shi, Kyoto (JP)

( * ) Notice: Subject to any disclaimer, the term of this patent is extended or adjusted under 35 U.S.C. 154(b) by 159 days.

(21) Appl. No.: 15/117,773

(22) PCT Filed: Feb. 26, 2015

(86) PCT No.: PCT/JP2015/055715
§ 371 (c)(1),
(2) Date: Aug. 10, 2016

(87) PCT Pub. No.: WO2015/129830
PCT Pub. Date: Sep. 3, 2015

(65) Prior Publication Data
US 2016/0354991 A1 Dec. 8, 2016

(30) Foreign Application Priority Data
Feb. 28, 2014 (JP) ................................. 2014-039992

(51) Int. Cl.
*B29C 43/18* (2006.01)
*B29C 51/12* (2006.01)
(Continued)

(52) U.S. Cl.
CPC ............ *B29C 43/18* (2013.01); *B29C 43/183* (2013.01); *B29C 51/12* (2013.01); *B29C 65/565* (2013.01);
(Continued)

(58) Field of Classification Search
CPC . B29C 51/12; B29C 43/183; B29C 2043/182; B29K 2715/003
See application file for complete search history.

(56) References Cited

U.S. PATENT DOCUMENTS 9,987,821 B2 * 6/2018 Fukuda ................ B29C 66/433
2009/0277579 A1 11/2009 Marelli et al.
2015/0306844 A1 10/2015 Fukuda et al.

FOREIGN PATENT DOCUMENTS

JP S5566113 U 5/1980
JP S6441708 U 3/1989
(Continued)

OTHER PUBLICATIONS

International Search Report dated May 26, 2015 issued in corresponding PCT International Application No. PCT/JP2015/055715.

*Primary Examiner* — Benjamin A Schiffman
(74) *Attorney, Agent, or Firm* — Troutman Sanders LLP

(57) ABSTRACT

A sandwich panel includes a reinforcement member having a recess formed to extend in a longitudinal direction over a predetermined length and open laterally. The thermoplastic resin core material has a rectangular flat board-like shape, and includes a protrusion which is disposed on a peripheral side surface portion thereof and which is capable of being laterally press-fit with respect to the recess. The protrusion has opposing surfaces respectively opposing mutually opposed inner surfaces of the recess, the opposing surfaces being oriented so as to protrude from the peripheral side surface portion. At least one of the opposing surfaces is provided with a plurality of protuberances disposed at an interval in the longitudinal direction. Each of the protuberances has a predetermined height from the opposing surfaces enabling the protuberances to tightly contact the inner surfaces of the recess at the time of press-fitting.

13 Claims, 7 Drawing Sheets

(51) Int. Cl.

| | | |
|---|---|---|
| *B29C 65/50* | (2006.01) | |
| *B29C 65/56* | (2006.01) | |
| *B32B 27/06* | (2006.01) | |
| *B32B 3/06* | (2006.01) | |
| *B60R 13/01* | (2006.01) | |
| *B29C 65/74* | (2006.01) | |
| *B29C 65/00* | (2006.01) | |
| *B32B 5/18* | (2006.01) | |
| *B32B 27/08* | (2006.01) | |
| *B62D 25/20* | (2006.01) | |
| *B62D 29/04* | (2006.01) | |
| *F16B 5/00* | (2006.01) | |
| B29C 43/34 | (2006.01) | |
| B29K 701/12 | (2006.01) | |
| B29L 7/00 | (2006.01) | |
| B29L 31/30 | (2006.01) | |

(52) U.S. Cl.
CPC ............ *B29C 65/74* (2013.01); *B29C 66/124* (2013.01); *B29C 66/3034* (2013.01); *B32B 3/06* (2013.01); *B32B 5/18* (2013.01); *B32B 27/065* (2013.01); *B32B 27/08* (2013.01); *B60R 13/013* (2013.01); *B62D 25/20* (2013.01); *B62D 29/043* (2013.01); *F16B 5/0004* (2013.01); *B29C 65/5071* (2013.01); *B29C 65/5085* (2013.01); *B29C 65/562* (2013.01); *B29C 66/1142* (2013.01); *B29C 66/43* (2013.01); *B29C 66/727* (2013.01); *B29C 66/73921* (2013.01); *B29C 2043/182* (2013.01); *B29C 2043/3433* (2013.01); *B29K 2701/12* (2013.01); *B29K 2715/003* (2013.01); *B29L 2007/002* (2013.01); *B29L 2031/30* (2013.01); *B32B 2250/03* (2013.01); *B32B 2250/40* (2013.01); *B32B 2471/00* (2013.01); *B32B 2605/00* (2013.01); *B32B 2607/00* (2013.01); *F16B 5/0028* (2013.01); *F16B 5/0068* (2013.01); *F16B 5/0096* (2013.01)

(56) References Cited

FOREIGN PATENT DOCUMENTS

| JP | H05187447 A | 7/1993 |
|---|---|---|
| JP | 2000177493 A | 6/2000 |
| JP | 2010174577 A | 8/2010 |
| WO | 2014/103580 A1 | 7/2014 |

\* cited by examiner

FIG. 5
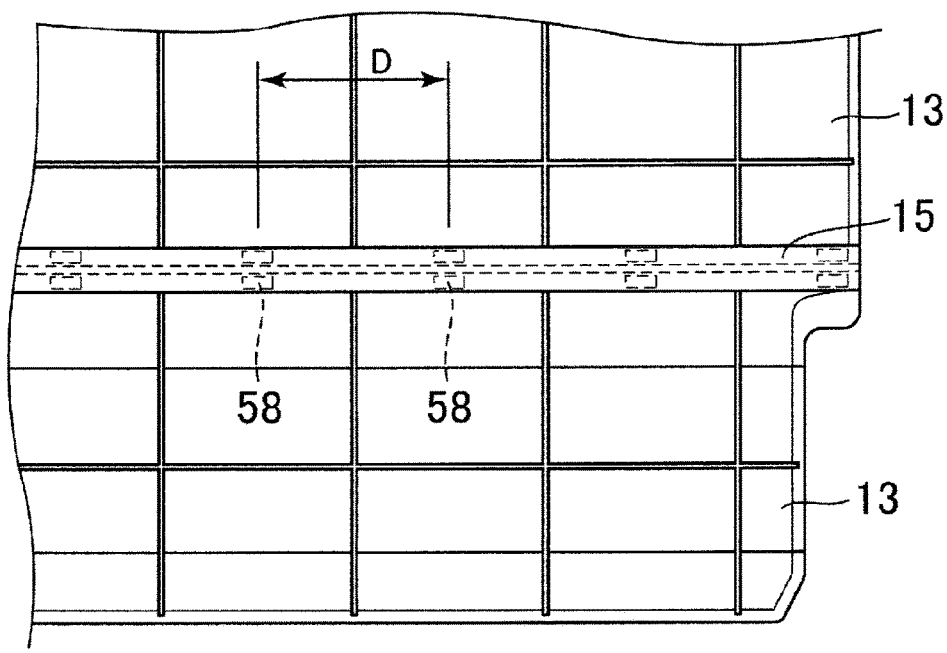
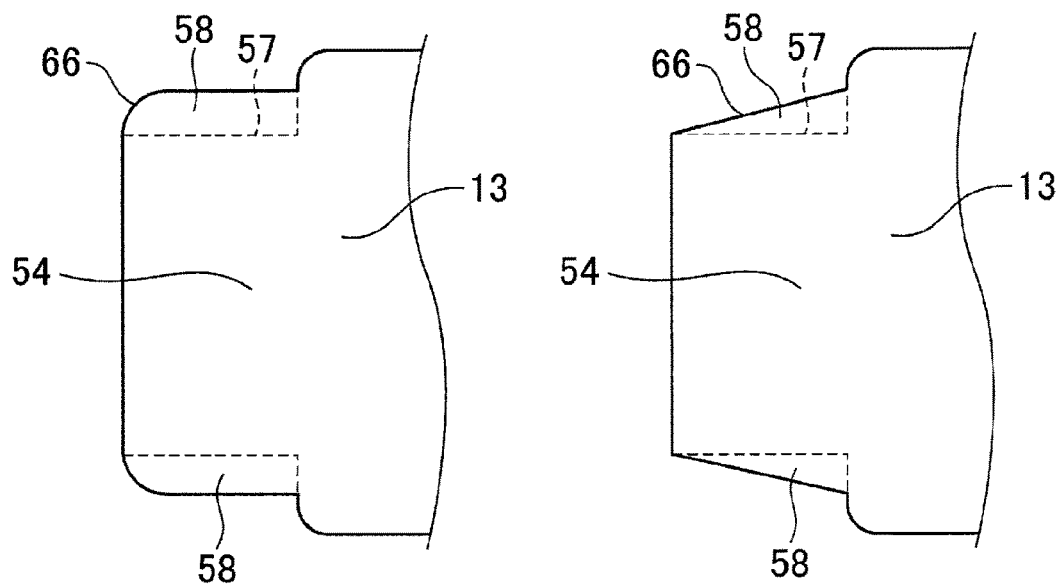
FIG. 6(A)    FIG. 6(B)

METHOD FOR MANUFACTURING A SANDWICH PANEL

CROSS-REFERENCE TO RELATED APPLICATIONS

This is a U.S. national phase application under 35 U.S.C. § 371 of International Patent Application No. PCT/JP2015/055715, filed on Feb. 26, 2015, and claims benefit of priority to Japanese Patent Application No. 2014-039992, filed on Feb. 28, 2014. The entire contents of these applications are hereby incorporated by reference.

TECHNICAL FIELD

The present invention relates to a sandwich panel and a method for manufacturing a sandwich panel. More specifically, the present invention relates to a sandwich panel having internally inserted resin core material and reinforcement member, wherein the resin core material and the reinforcement member are integrated by ensuring the press-fitting of the reinforcement member with the resin core material regardless of the dimensional tolerance of the resin core material, and a method for manufacturing the sandwich panel.

BACKGROUND

From the viewpoint of ensuring light weight and stiffness, sandwich panels made from resin are adopted for various purposes.

The resin sandwich panel may include two skin material sheets of resin and a thermoplastic resin core material disposed between the skin material sheets. The surfaces of the thermoplastic resin core material are adhered to the corresponding skin material sheets of resin by face-to-face bonding. As disclosed in Japanese Unexamined Patent Application Publication No. 2010-174577A, from the viewpoint of further ensuring stiffness, a reinforcement member may be provided between the skin material sheets and integrally bonded with the thermoplastic resin core material.

More specifically, the thermoplastic resin core material is of split type, and the reinforcement member is an H-shaped extrusion reinforcement. The reinforcement member is disposed between adjacent split portions of the thermoplastic resin core material and has a first recess opening on one side and a second recess opening on the other side. The thermoplastic resin core material is provided at an end portion thereof with a protrusion which has a length equal to or greater than a predetermined length of the reinforcement member and which can be laterally press-fit into the recess. In order to make the reinforcement member flush with the thermoplastic resin core material, the protrusion is formed of an engaging step portion which is a recessed portion of the end portion of the thermoplastic resin core material.

Japanese Unexamined Patent Application Publication No. 2010-174577A discloses various modes for enabling press-fitting between the reinforcement member and the thermoplastic resin core material.

More specifically, in one type that is disclosed, one and/or the other of mutually opposed ends in the opening of the reinforcement member is provided with a hook-shaped portion extending in an opening-narrowing direction. Correspondingly, the protrusion of the thermoplastic resin core material is provided with a groove in which the hook-shaped portion can engage.

In another type disclosed, the recess of the reinforcement member is provided with a number of narrow ridges extending in the longitudinal direction.

In yet another type disclosed, the protrusion of the thermoplastic resin core material has a notch.

However, such conventional reinforcement member-equipped sandwich panel has the following technical problems, due to size variations during the molding of the resin core material.

First, it is difficult to press-fit the reinforcement member with respect to the molded resin core material.

More specifically, when the resin core material, particularly a solid foamed resin core material, is molded, there are size variations in the thickness direction. Accordingly, if the thickness of the protrusion is set greater than the interval of the inner surfaces of the recess throughout in the longitudinal direction thereof, it may become difficult to press-fit the resin core material into the reinforcement member in the case of a maximum dimensional tolerance.

Secondly, it is difficult to integrally hold the molded resin core material and the reinforcement member, posing a problem in efficient manufacture of the resin sandwich panel.

More specifically, if the thickness of the protrusion is set uniformly throughout in the longitudinal direction thereof, the reinforcement member may fall from the resin core material in the case of a minimum dimensional tolerance, as opposed to the first case. The process of manufacturing the resin sandwich panel is conventionally performed as follows. Between split molds, two resin sheets in molten state are disposed. The reinforcement member and the resin core material are made into an integral component, which is then set on an insert robot. The insert robot positions the integral component with respect to the resin sheets, and the split molds are clamped.

Accordingly, in order to make the reinforcement member and the resin core material into an integral component, a separate step is required to adhere the reinforcement member and the resin core material to each other using a hot melt adhesive, for example. This may pose a problem in efficient manufacture of the resin sandwich panel.

SUMMARY

In view of the above-described technical problems, an object of the present invention is to provide a sandwich panel having internally inserted resin core material and reinforcement member, wherein the resin core material and the reinforcement member are integrated by ensuring the press-fitting of the reinforcement member with the resin core material regardless of the dimensional tolerance of the resin core material, and to provide a method for manufacturing the sandwich panel.

A sandwich panel according to the present invention to solve the above problems includes two skin material sheets of resin and a thermoplastic resin core material disposed between the skin material sheets, the thermoplastic resin core material has surfaces face-to-face bonded to the corresponding skin material sheets of resin, and the thermoplastic resin core material is integrally bonded to a reinforcement member between the skin material sheets. The reinforcement member has a recess formed to extend in a longitudinal direction over a predetermined length and open laterally; the thermoplastic resin core material has a rectangular flat board-like shape and includes a protrusion, disposed on a peripheral side surface portion thereof, that is allowed to be laterally press-fit with respect to the recess; the protrusion has opposing surfaces respectively opposing mutually opposed inner surfaces of the recess and oriented so as to protrude from the peripheral side surface portion; at least one of the opposing surfaces includes a plurality of protuberances disposed at an interval in the longitudinal direction; and each of the protuberances has a predetermined height from the opposing surfaces so as to enable the protuberances to tightly contact the inner surfaces of the recess at the time of press-fitting.

According to the sandwich panel having the above configuration in which the resin core material and the reinforcement member are internally inserted, and in which the protrusion of the resin core material is press-fit into the recess of the reinforcement member for integration, the protrusion has the opposing surfaces respectively opposing the mutually opposed inner surfaces of the recess and oriented so as to protrude from the peripheral side surface portion, at least one of the opposing surfaces having a plurality of protuberances disposed at an interval in the longitudinal direction, each of the protuberances having a predetermined height from the opposing surfaces so as to enable the protuberances to tightly contact the inner surfaces of the recess at the time of press-fitting. Accordingly, the press-fitting of the resin core material with respect to the reinforcement member can be ensured even when the resin core material has a maximum thickness dimensional tolerance. Furthermore, even when the thickness dimensional tolerance is at a minimum, the reinforcement member can be prevented from falling from the resin core material. Overall, regardless of the dimensional tolerance of the resin core material, the press-fitting of the reinforcement member with the resin core material is ensured, whereby the resin core material and the reinforcement member can be integrated.

In addition, when the protrusion is press-fit, it is preferable that the protuberances be compressively deformed to form a contact surface that tightly contacts the inner surfaces of the recess.

Moreover, the protuberances preferably include an inclined surface or a gradually curved surface at least on a distal end side of the protrusion with which the reinforcement member is press-fit, in a cross section perpendicular to the longitudinal direction of the reinforcement member.

Further, the protuberances preferably include a contact surface tightly contacting the inner surfaces of the recess, the contact surface being formed closer to the peripheral side surface portion from the inclined surface or the gradually curved surface.

Additionally, the thermoplastic resin core material preferably has a length equal to or greater than a predetermined length of the reinforcement member; and the reinforcement member is preferably press-fit, at an end portion thereof, so as not to protrude from the thermoplastic resin core material.

In addition, the plurality of protuberances is preferably disposed on each of the opposing surfaces.

Moreover, the thermoplastic resin core material is preferably a solid integral molded article made from foamed resin; the protuberances of one of the opposing surfaces preferably include a contact surface tightly contacting the inner surface on an upper end side of the recess, and the protuberances of the other of the opposing surfaces preferably include a contact surface tightly contacting the inner surface on a lower end side of the recess, the contact surfaces having an interval set so as to be greater than at least an interval between the opposed inner surfaces of the recess; and the contact surfaces of the plurality of protuberances preferably have a height and/or area set so as to enable the protrusion to be laterally press-fit with respect to the recess within an expected dimensional tolerance range of thickness of the thermoplastic resin core material.

Further, the height and area of the contact surfaces of the plurality of protuberances are preferably set so as to prevent the protrusion from falling from the recess at a minimum dimensional tolerance, and so as to ensure the press-fitting of the protrusion into the recess at a maximum dimensional tolerance.

Additionally, the thickness of the protrusion may be set so that the opposing surfaces do not contact the inner surfaces of the recess at the time of press-fitting of the protrusion into the recess.

In addition, the thermoplastic resin core material may be of split type; and the reinforcement member preferably includes a first recess with an opening on one side and a second recess with an opening on the other side between adjacent split portions of the thermoplastic resin core material.

Further, the reinforcement member is preferably an H-shaped extrusion reinforcement; and the opposing surfaces of the protrusion are preferably set so as to be lower than the corresponding surfaces of the thermoplastic resin core material so that the thermoplastic resin core material and the reinforcement member become substantially flush when the thermoplastic resin core material is press-fit into the reinforcement member.

Additionally, an abutting surface is preferably disposed at a root portion of the protrusion, the abutting surface preferably forms a step in cooperation with the opposing surfaces so as to abut on a side surface portion on a U-shaped opening portion side of the H-shaped extrusion reinforcement when the thermoplastic resin core material is press-fit into the reinforcement member.

Moreover, the opposing surfaces are preferably formed in an inclined shape so that the interval of the opposing surfaces is decreased in a direction away from the abutting surface.

In a method for molding a sandwich panel according to the present invention to solve the above problems, the sandwich panel includes a resin core material disposed between two skin material sheets of resin.

The method includes: a step of preparing a reinforcement member having a recess formed to extend in a longitudinal direction over a predetermined length and open laterally, and a thermoplastic resin core material including a protrusion capable of being partially press-fit with respect to the recess in a longitudinal direction, the protrusion being disposed on a peripheral side surface portion of the thermoplastic resin core material; a step of disposing two thermoplastic resin sheets in molten state between the pair of split molds in such a manner as to extend beyond an annular pinch-off part formed at a peripheral edge portion of a cavity of each of the pair of split molds; a step of making the reinforcement member and the thermoplastic resin core material into an integral component by partially press-fitting the protrusion into the recess in the longitudinal direction, and positioning the integral component with respect to the thermoplastic resin sheet; and a step of integrating peripheral edge portions of the two thermoplastic resin sheets by welding inner surfaces of the two thermoplastic resin sheets along the pinch-off parts of the pair of split molds by moving the pair of split molds to a clamping position so as to sandwich the integral component between the two thermoplastic resin sheets in molten state, and face-to-face bonding the integral component to the corresponding skin material sheets.

BRIEF DESCRIPTION OF THE DRAWINGS

FIG. 5 is a partial plan view of a connecting portion between the thermoplastic resin core material 13 and the reinforcement member 15 of the sandwich panel according to the example of the present invention.

FIGS. 6(A) and 6(B) show schematic cross sectional views of modifications of protuberances 58 of the sandwich panel according to the example of the present invention, with which protuberances a protrusion 54 of the thermoplastic resin core material 13 is provided, FIG. 6(A) showing an example in which an inclined surface 66 has a gradually curved surface, and FIG. 6(B) showing an example in which the inclined surface 66 extends to the root of the protrusion 54 and does not have a plane parallel with opposing surfaces 57.

DETAILED DESCRIPTION

An example of a sandwich panel and a method for molding the same according to the present invention will be described in detail with reference to the drawings.

The sandwich panel may be suitably used as a structural member having high deflection stiffness or strength against flexural buckling, for uses including automobiles, aircraft, vehicles and ships; building materials; housings of various electric devices; and sports/leisure applications. In particular, when used as a structural member for automobiles and the like, the sandwich panel can contribute to weight reduction and an increase in fuel economy. Specifically, the sandwich panel contributes to weight reduction when used as a structural member of interior panels, such as a cargo floor board, a deck board, a rear parcel shelf, a roof panel, or a door trim; door inner panels; platforms; hardtops; sunroofs; hoods; bumpers; floor spacers; and tibia pads. The shape of the sandwich panel may be appropriately determined in accordance with the purpose of the product.

Figure 7:
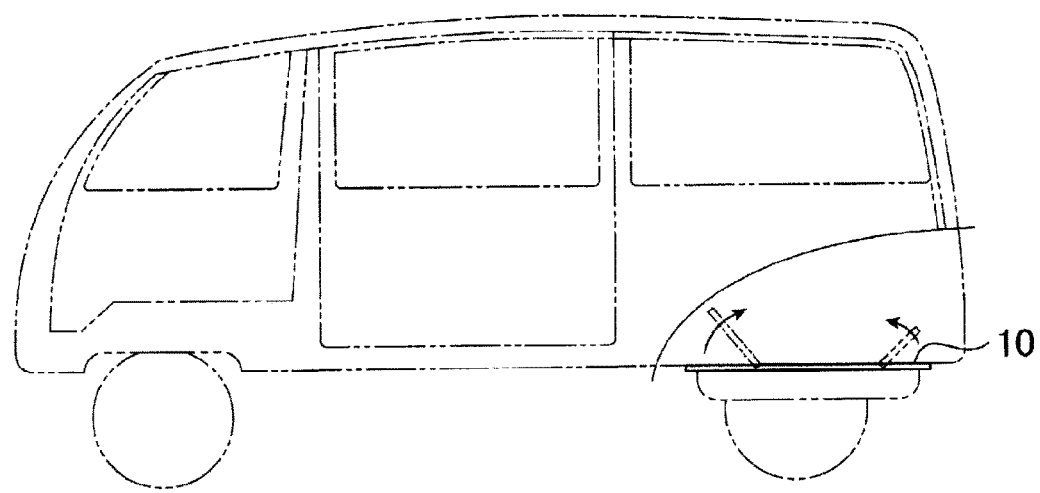
FIG. 7 is a schematic side view illustrating an example in which the sandwich panel according to the example of the present invention is used as a cargo floor panel of an automobile.

The present example will be described with reference to an example in which the sandwich panel is used in an automobile cargo floor lid, as illustrated in FIG. 7, from which weight reduction and high stiffness are required.

Figure 1:
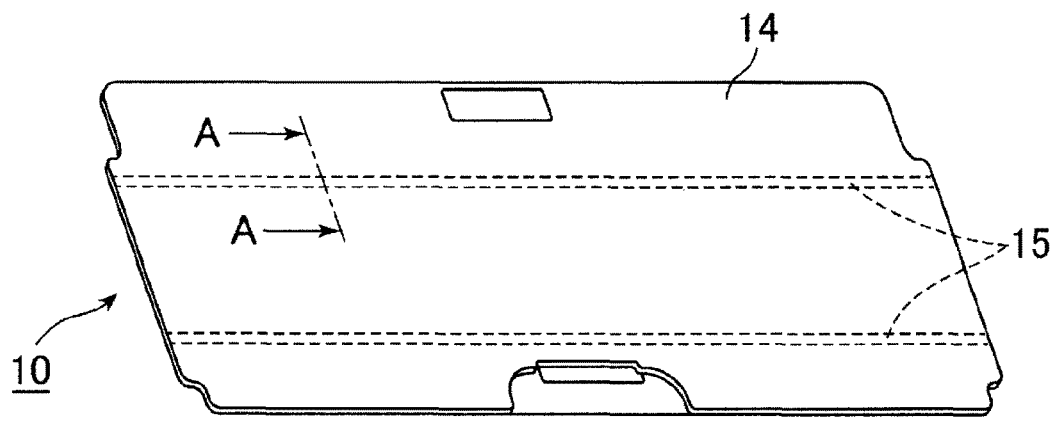
FIG. 1 is a perspective view of a sandwich panel according to an example of the present invention.
Figure 2:
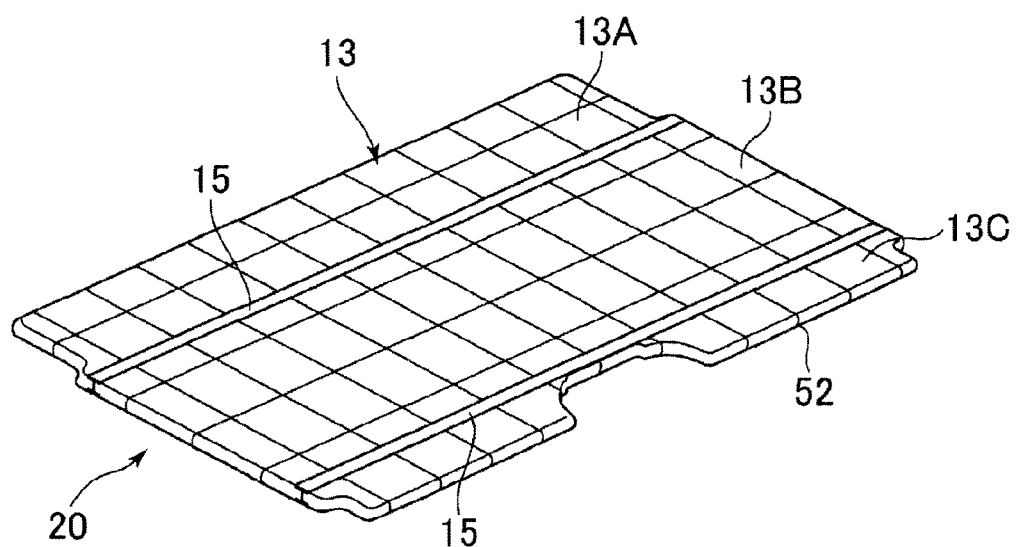
FIG. 2 is a perspective view of the sandwich panel according to the example of the present invention in a state where a thermoplastic resin core material 13 and a reinforcement member 15 are integrated.
Figure 3:
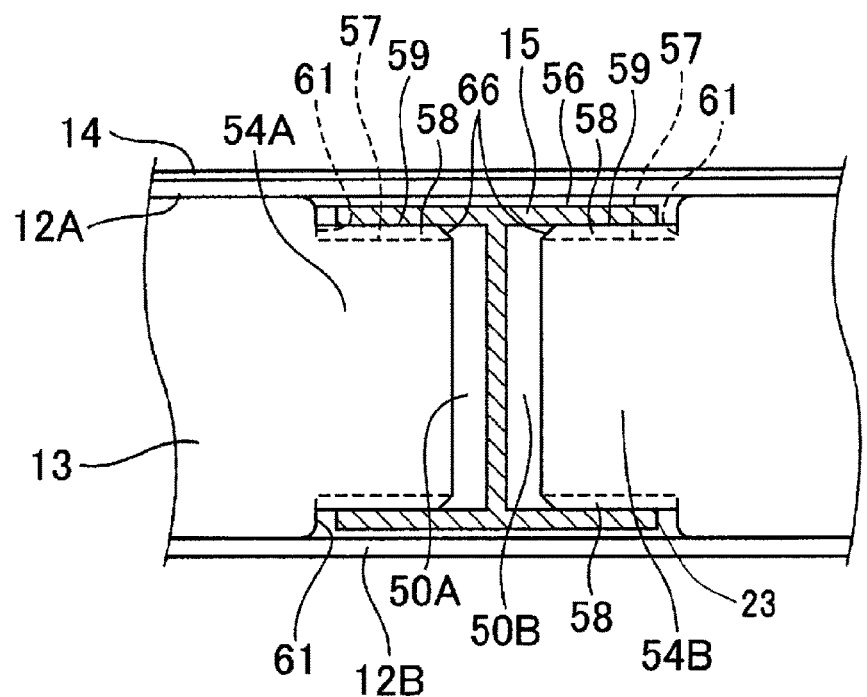
FIG. 3 is a cross sectional view taken along line A-A of FIG. 1.

As illustrated in FIG. 1 to FIG. 3, the sandwich panel 10 includes a front-side skin material sheet 12A and a back-side skin material sheet 12B; a foamable thermoplastic resin core material 13 disposed between the skin material sheets 12A and 12B; and a decorative material sheet 14 affixed to the outer surface of the front-side skin material sheet 12A. Each of the surfaces of the thermoplastic resin core material 13 is face-to-face bonded to the corresponding skin material sheet of resin. Between the skin material sheets, the thermoplastic resin core material 13 is integrally bonded with a reinforcement member 15. The sandwich panel 10 is thus configured as a laminated structure of the decorative material sheet 14, the front-side skin material sheet 12A, the thermoplastic resin core material 13, and the back-side skin material sheet 12B.

The skin material sheet 12 is made of a sheet formed from, e.g., a polyolefin-based resin, such as polypropylene, or engineering plastics. From the viewpoint of ensuring the interval between the skin material sheets 12 disposed on both sides of the thermoplastic resin core material 13; namely, to ensure the bulk (thickness) of the thermoplastic resin core material 13, and ensuring the stiffness, or flexural stiffness in particular, of the sandwich panel 10 as a whole, the material of the skin material sheet 12 is required to have a stiffness greater than at least the stiffness of the thermoplastic resin core material 13. The skin material sheets 12 constitute an upper surface wall and a lower surface wall of the sandwich panel 10. Preferably, the terminal ends of the front-side skin material sheet 12A and the back-side skin material sheet 12B at the outer periphery of the sandwich panel 10 are welded and integrated by means of pinch-off parts, forming side walls. Between the side walls at the outer periphery of the sandwich panel 10 and the outer periphery of the thermoplastic resin core material 13, a gap is formed. This prevents deformation of the sandwich panel 10 due to a difference in thermal contraction between the skin material sheets 12 and the thermoplastic resin core material 13 after molding.

More specifically, from the viewpoint of preventing thickness variations caused by drawdown, neck-in and the like, it is preferable to use a resin material with high melt tensile force for the skin material sheet 12. On the other hand, for the skin material sheet 12, it is also preferable to use a resin material with high fluidity so as to achieve good transfer and following properties with respect to the mold.

When the decorative material sheet 14 is provided on the surface of the skin material sheet 12, the decorative material sheet 14 may be configured for the purpose of enhancing appearance or decorativeness, or for protection of an object that may come into contact with the molded article (such as, in the case of a cargo floor board, baggage placed on the board upper surface, for example). The material of the decorative material sheet 14 may include fibrous-skin material, sheet-like skin material, and film-like skin material.

As illustrated in FIG. 1 and FIG. 2, two reinforcement members 15 are adopted. The two reinforcement members 15 are disposed in parallel with each other, each being an H-shaped extrusion reinforcement. The two reinforcement members 15 have recesses 50 formed to extend in the longitudinal direction over a predetermined length and open laterally. More specifically, each of the reinforcement members 15 is disposed between the adjacent split portions of the thermoplastic resin core material 13, and includes a first recess 50A opening on one side and a second recess 50B opening on the other side.

The reinforcement member 15 has an elongated shape (see FIG. 2) with the same length as the end portion of the thermoplastic resin core material 13. By press-fitting a protrusion 54 of the thermoplastic resin core material 13 into the recess 50 of the reinforcement member 15, an interior part 20 in which the thermoplastic resin core material 13 and the reinforcement member 15 are integrated is obtained. The reinforcement member 15 may be a metal, such as aluminum, or hard plastic.

The reinforcement member 15 may have shapes other than that of the H-shaped extrusion reinforcement, such as C shape or U shape, as long as the shape allows the reinforcement member 15 to be fittingly integrated with the thermoplastic resin core material 13.

As illustrated in FIG. 2, the thermoplastic resin core material 13 is a solid, rectangular flat board-like member of split type (divided into three parts in the present example). The thermoplastic resin core material 13, as illustrated in FIG. 3 and FIG. 4, includes the protrusion 54 on a peripheral side surface portion 52 thereof, the protrusion being capable of laterally press-fitting into the recess 50.

The protrusion 54 includes opposing surfaces 57 which are set so as to be lower than corresponding surfaces of the thermoplastic resin core material 13, so that, when the thermoplastic resin core material 13 is press-fit into the reinforcement member 15, the thermoplastic resin core material 13 and the reinforcement member 15 are flush with each other.

At the root of the protrusion 54, an abutting surface 61 is provided. The abutting surface 61 forms a step in cooperation with the opposing surfaces 57 so that the abutting surface 61 can abut on a side surface portion 23 on the U-shape opening portion side of the H-shaped extrusion reinforcement when the thermoplastic resin core material 13 is press-fit into the reinforcement member 15.

Figure 4:
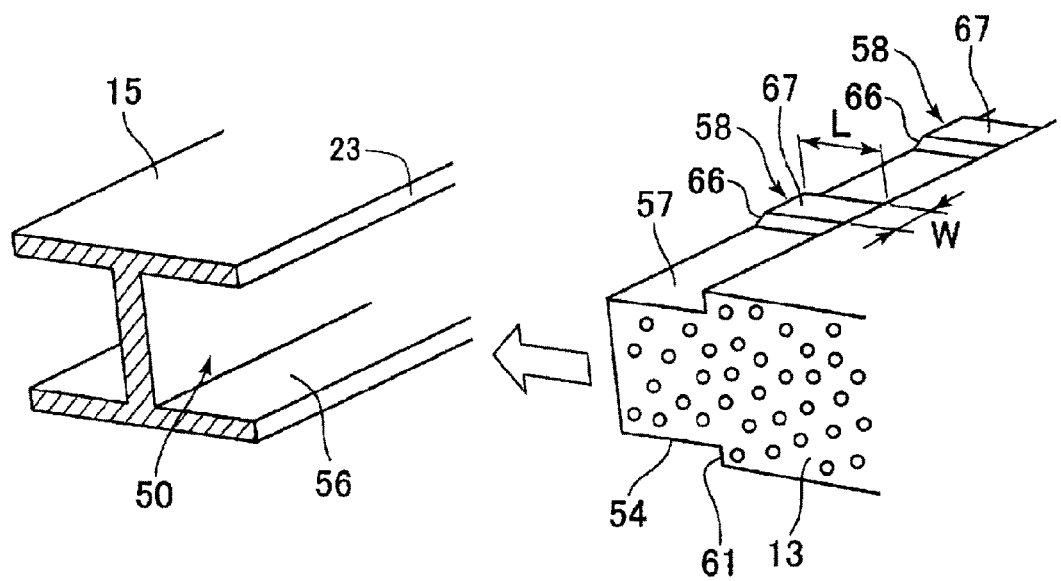
FIG. 4 is a partial perspective view illustrating the reinforcement member 15 being press-fit with respect to the thermoplastic resin core material 13 of the sandwich panel according to the example of the present invention.

As illustrated in FIG. 3 to FIG. 5, the protrusion 54 is provided with the opposing surfaces 57 respectively opposing mutually opposed inner surfaces 56 of the recess 50, the opposing surfaces 57 being oriented so as to protrude from the peripheral side surface portion 52. Each of the opposing surfaces 57 is provided with a plurality of protuberances 58 disposed at an interval in the longitudinal direction. Each of the protuberances 58 includes an inclined surface 66 at the end of the protrusion 54 on which the reinforcement member 15 is press-fit. The protuberances 58 each have a plane 67 continuous with the inclined surface 66 and extending in parallel with the opposing surfaces 57 to the root of the protrusion 54. The inclined surface 66 has an inclination angle which may be determined in consideration of the ease of press-fitting of the thermoplastic resin core material 13 into the reinforcement member 15.

Each of the protuberances 58 includes a contact surface 59 having a predetermined height from the opposing surfaces 57 so as to tightly contact the inner surfaces 56 of the recess 50 at the time of press-fitting. The contact surface 59 is formed closer to the peripheral side surface portion 52 from the inclined surface 66.

Figure 10:
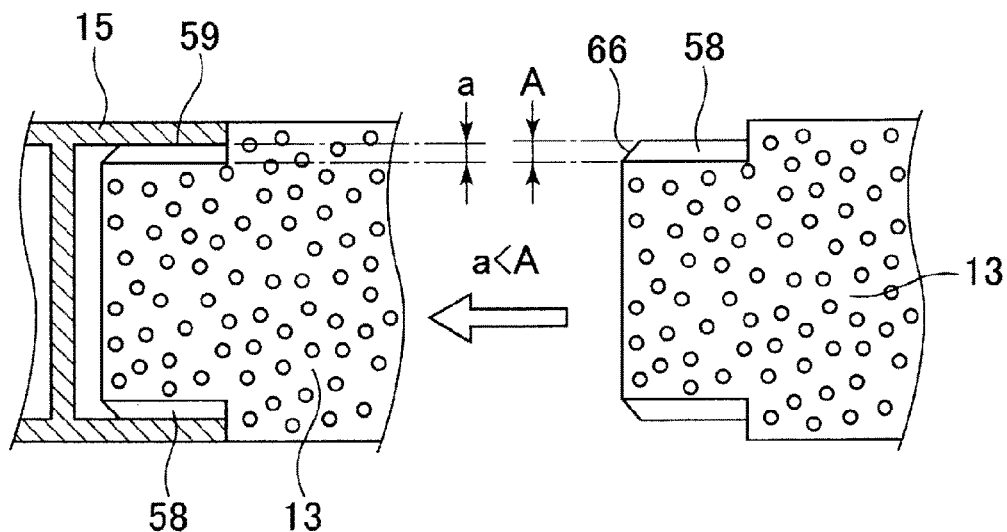
FIG. 10 is a partial cross sectional view of the reinforcement member 15 being press-fit with respect to the thermoplastic resin core material 13 of the sandwich panel according to the example of the present invention, illustrating a deformed state of the protuberances.

More specifically, as illustrated in FIG. 10, the height of the protuberances 58 from the opposing surfaces 57 is decreased from a height a prior to the press-fitting to a height a after the press-fitting. The top surface of the compressed and deformed protuberances 58 forms the contact surface 59.

The thermoplastic resin core material 13 is a solid integral molded article made of foamed resin. The interval between the contact surface 59 of the protuberances 58 of one opposing surface 57 and the contact surface 59 of the protuberances 58 of the other opposing surface 57 is set so as to be at least greater than the interval between the opposed inner surfaces 56 of the recess 50. Preferably, the height and/or area of the contact surface 59 of the plurality of protuberances 58 may be set, within the expected dimensional tolerance range of the thickness of the thermoplastic resin core material 13, so that the protrusion 54 can be laterally press-fit with respect to the recess 50. More specifically, the height and area of the contact surface 59 of the plurality of protuberances 58 may desirably be set so as to prevent the protrusion 54 from falling from the recess 50 at a minimum dimensional tolerance, while ensuring the press-fitting of the protrusion 54 into the recess 50 at a maximum dimensional tolerance.

In this case, the expected dimensional tolerance range of the thickness of the thermoplastic resin core material 13 tends to become wider as the expansion ratio is increased. On the other hand, the higher the expansion ratio, the greater the possible amount of deformation of the protuberances 58 tends to become.

In the light of the above, and from the viewpoint of the possible amount of deformation of the protuberances 58 of the thermoplastic resin core material 13 at the time of press-fitting and the frictional resistance between the reinforcement member 15 and the core material, the details of the protuberances 58 and the contact surface 59 may be determined as follows.

With regard to the degree of press-fitting between the reinforcement member 15 and the thermoplastic resin core material 13, it suffices if, as will be described later, the reinforcement member 15 and the thermoplastic resin core material 13 can be made into an integral component (interior part 20) and positioned with respect to the thermoplastic resin sheet at the time of molding the sandwich panel. For example, the degree of press-fitting is determined from the viewpoint of preventing the fall of the thermoplastic resin core material 13 from the reinforcement member 15 when the integral component is positioned with respect to the resin sheet by an insert robot.

In this case, the degree of press-fitting affects the frictional resistance between the reinforcement member 15 and the core material. The total area of the contact surface 59 formed on the plurality of protuberances 58 of the thermoplastic resin core material 13 may be determined in consideration of the property of the inner surfaces of the recess 50 of the reinforcement member 15, the thermoplastic resin core material 13, the expansion ratio, and the expected size error. The total area may be used in determining the number of the protuberances 58, an interval D of the adjacent protuberances 58 (see FIG. 5), and a width W and length L of each of the protuberances 58 (see FIG. 4). Preferably, the protuberances 58 may be disposed in an evenly dispersed manner in the longitudinal direction of the reinforcement member 15.

The thickness of the protrusion 54 is set such that, at the time of press-fitting the protrusion 54 into the recess 50, the opposing surfaces 57 do not contact the inner surfaces 56 of the recess 50.

In a modification, as illustrated in FIG. 6(A), the inclined surface 66 may be a gradually curved surface, such as a circular-arc surface, instead of a planar inclined surface, as long as the surface facilitates the press-fitting. Alternatively, as illustrated in FIG. 6(B), the inclined surface 66 may extend to the root of the protrusion 54 without having a plane parallel with the opposing surfaces 57. In the case of FIG. 6(B), the press-fitting may be adjusted by adjusting the depth to which the recess 50 is fit in the protrusion 54.

The thermoplastic resin core material 13 is formed from a resin with an added foaming agent. Examples of the resin for forming the thermoplastic resin core material 13 include the following thermoplastic resins and thermosetting resins. The thermoplastic resins include: polyolefins (for example, polypropylene and high-density polyethylene) comprising homopolymers or copolymers of olefins such as ethylene, propylene, butane, isoprene pentene, and methylpentene; polyamide; polystyrene; polyvinyl chloride; polyacrylonitrile; acrylic derivatives such as ethylene-ethyl acrylate copolymer; polycarbonate; vinyl acetate copolymers such as ethylene-vinyl acetate copolymer; ionomer; terpolymers such as ethylene-propylene-dienes; acrylonitrile-styrene copolymer; ABS resin; polyphenylene oxide; polyacetal; and thermoplastic polyimides. The thermosetting resins include phenol resin; melamine resin; epoxy resin; polyurethane; and thermosetting polyimides. Of these examples, either one type may be used individually or two or more types may be used in a mixture. In particular, when the thermoplastic resin core material 13 and the skin material sheet 12 are made from the same material, they can be adhered each other by thermal welding without using a solvent or the like. Thermally weldable foamed beads are introduced into a mold and vapor is circulated to cause secondary foaming of the foamed beads, thereby preparing the thermoplastic resin core material 13 molded in the shape of the mold.

The foaming agent may be a physical foaming agent, a chemical foaming agent, or a mixture thereof. Examples of the physical foaming agent include inorganic physical foaming agents such as air, carbonic acid gas, nitrogen gas, and water; organic physical foaming agents such as butane, pentane, hexane, dichloromethane, and dichloroethane; and supercritical fluids thereof. Supercritical fluid is preferably made using carbon dioxide, nitrogen, or the like. Supercritical fluid may be obtained by achieving a critical temperature of 149.1° C. and critical pressure of 3.4 MPa or above in the case of nitrogen, or a critical temperature of 31° C. and critical pressure of 7.4 MPa or above in the case of carbon dioxide.

Figure 8:
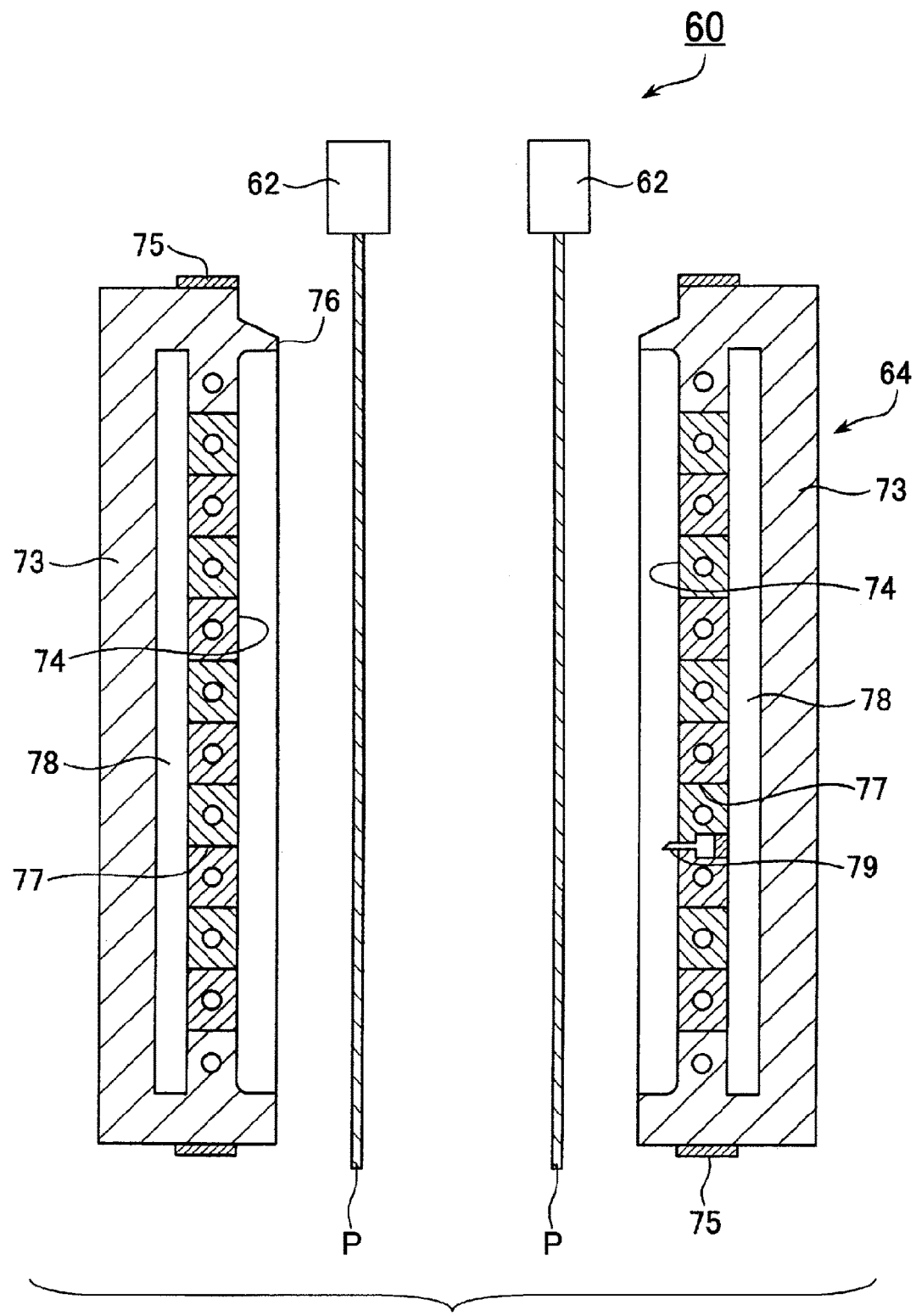
FIG. 8 illustrates a state where, in the process of molding the sandwich panel according to the example of the present invention, skin material sheets are disposed between split molds.

As illustrated in FIG. 8, a molding device 60 for the sandwich panel 10 (sandwich panel molding device) includes extrusion devices 62 and a clamp device 64 disposed below the extrusion devices 62. Resin sheets P in molten state extruded from the extrusion devices 62 are fed to the clamp device 64. The resin sheets P in molten state are molded by the clamp device 64.

The clamp device 64 as well as the extrusion devices 62 may be of conventionally known type, and therefore their detailed description will be omitted. The clamp device 64 includes two split molds 73 and a mold drive device. The mold drive device moves the molds 73 between an open position and a closed position, in a direction substantially perpendicular to the direction in which the resin sheets P in molten state are supplied.

The two split molds 73 are disposed with cavities 74 opposed to each other. The two split molds 73 are each disposed such that the cavities 74 are oriented in a substantially vertical direction. On the surface of each of the cavities 74 and, more accurately, inside an annular pinch-off part 76 which will be described below, irregularities are provided. The irregularities are provided in accordance with the outer shape and surface shape of the skin material sheet 12 that will be molded based on the resin sheets P in molten state.

Each of the two split molds 73 has the pinch-off part 76 formed around the cavity 74 thereof. The pinch-off part 76 is formed around the cavities 74 in annular shape so as to protrude toward the opposite molds 73. Accordingly, when the two split molds 73 are clamped, the end portions of the respective pinch-off parts 76 are abutted against each other. As a result, a parting line PL is formed on the peripheral edge of the resin sheets P in molten state.

Between the two split molds 73, a pair of frame members 75 is disposed in a nested manner with respect to the pair of molds 73, substantially in parallel with the cavities 74. Each of the pair of frame members 75 has an opening. The pair of frame members 75 are movable in a horizontal direction by a frame member drive device which is not illustrated. Accordingly, each of the pair of frame members 75 can be moved toward the corresponding resin sheet P in molten state so as to hold the resin sheet P, and, in this state, each of the pair of frame members 75 can be moved in the reverse direction until the tip of the pinch-off part 76 of the corresponding mold 73 abuts on the surface of the resin sheet P through the opening.

The mold drive device may be of conventional type, and therefore its description will be omitted. The two split molds 73 are each driven by the mold drive device. In the open position, the two resin sheets P in molten state can be disposed at a distance from each other between the two split molds 73. On the other hand, in the closed position, the pinch-off parts 76 of the two split molds 73 are abutted on each other. As the annular pinch-off parts 76 are abutted on each other, a hermetic space is formed in the two split molds 73. In FIG. 8, reference numeral 77 designates a ventilating contact surface; reference numeral 78 designates a vacuum chamber; and reference numeral 79 designates an atmosphere open pin.

A method for molding the sandwich panel 10 will be described.

First, the thermoplastic resin core material 13 is molded in advance into a predetermined shape by, for example, in-mold beads foaming molding. The thermoplastic resin core material 13 is press-fit and thereby integrated with the reinforcement member 15, thus completing the interior part 20 in advance.

For the press-fitting of the protrusion 54 of the thermoplastic resin core material 13 into the recess 50 of the reinforcement member 15 for integration, the protrusion 54 is provided with the opposing surfaces 57 oriented so as to protrude from the peripheral side surface portion 52, the opposing surfaces 57 respectively opposing the mutually opposed inner surfaces 56 of the recess 50. At least one of the opposing surfaces 57 is provided with the plurality of protuberances 58 disposed at an interval in the longitudinal direction. Each of the protuberances 58 has the contact surface 59 having a predetermined height from the opposing surfaces 57 so as to tightly contact the inner surfaces 56 of the recess 50 at the time of press-fitting. Accordingly, even when the thermoplastic resin core material 13 has a maximum thickness dimensional tolerance, press-fitting of the thermoplastic resin core material 13 with respect to the reinforcement member 15 can be ensured. In addition, even when the thickness dimensional tolerance is at a minimum, the reinforcement member 15 can be prevented from falling from the thermoplastic resin core material 13. Overall, by ensuring the press-fitting of the reinforcement member 15 with the thermoplastic resin core material 13, regardless of the dimensional tolerance of the thermoplastic resin core material 13, the thermoplastic resin core material 13 and the reinforcement member 15 can be integrated into the interior part 20.

Then, the sheet-like decorative material sheet 14 is inserted between one of the split molds 73 and one of the frame members 75, laterally of the two split molds 73. The sheet-like decorative material sheet 14 is temporary secured using the temporary securing pin (not illustrated) of the one split mold 73, so as to cover the cavity 74 of the one split mold 73.

Thereafter, as illustrated in FIG. 8, the resin sheets P in molten state (thermoplastic resin sheets) are extruded vertically downward from the respective die slits, and the two resin sheets P are supplied between the two split molds 73. Then, the pair of frame members 75 is moved toward the corresponding resin sheets P by the frame member drive device.

The frame members 75 holding the resin sheets P are moved toward the corresponding split molds 73 until the pinch-off part 76 of the molds 73 abuts on the surface of the resin sheets P opposite the cavities 74, through the opening of the frame members 75. In this way, the hermetic space is formed by the surface of the resin sheets P opposite the cavities 74, the pinch-off part 76, and the cavities 74.

The hermetic space is then suctioned via the respective split molds 73, whereby the corresponding resin sheets P are pressed onto the cavities 74 and formed in a shape conforming to the cavities 74. One of the resin sheets P is formed and then welded to the decorative material sheet 14 disposed between the resin sheet P and the cavity 74.

Thereafter, the interior part 20 is held by the suction-attachment disc of a manipulator (not illustrated) and inserted between the two split molds 73 from the side.

Figure 9:
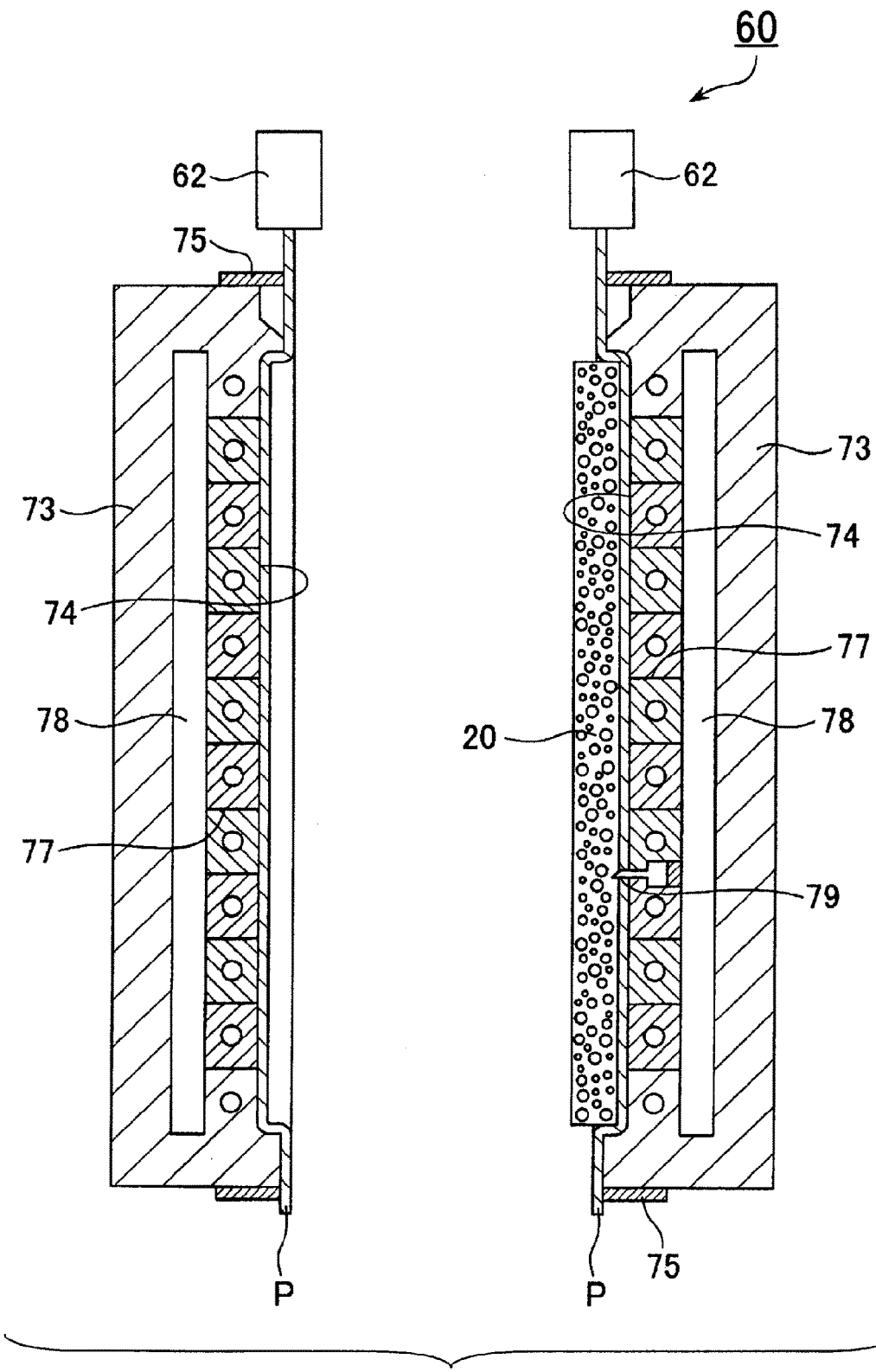
FIG. 9 illustrates a state where, in the process of molding the sandwich panel according to the example of the present invention, an integral component of the thermoplastic resin core material 13 and the reinforcement member 15 is pressed onto one of the skin material sheets.

The manipulator is then moved horizontally toward the right-side split mold 73, as illustrated in FIG. 9. In this way, the interior part 20 is pressed onto the resin sheet P being suction-attached on the cavity 74 of the right-side split mold 73, whereby the interior part 20 is welded to the resin sheet P.

The suction-attachment disc is then detached from the interior part 20, the manipulator is pulled out from between the two split molds 73, and preparations for clamping are made.

The clamping is performed by moving the two split molds 73, using the mold drive device, from the open position toward each other and to the closed position. As a result, the interior part 20 having been welded to the one resin sheet P (to the right in the drawing) is welded to the other resin sheet P. In addition, the peripheral edges of the resin sheets P are welded, forming the parting line PL. During the clamping, the interior part 20 per se is welded to the molten skin material sheet 12 in a pre-molded, cold state, as opposed to the case of the skin material sheet 12. Accordingly, the interior part 20 per se is positioned in advance so as not to be deformed by the clamping.

Thus, there is completed the sandwich panel 10 in which the decorative material sheet 14, the skin material sheet 12, the interior part 20, and the skin material sheet 12 are laminated.

Thereafter, the two split molds 73 are opened, the cavities 74 are divided from the completed sandwich panel 10, and burrs formed around the parting line PL are removed.

Thus the molding of the sandwich panel 10 is completed.

In the following, another example of the present invention will be described with reference to the drawings. In the following description, constituent elements similar to those of the previous example will be designated with similar reference numerals so as to omit their descriptions. The features of the present example will be described in detail.

Figure 11:
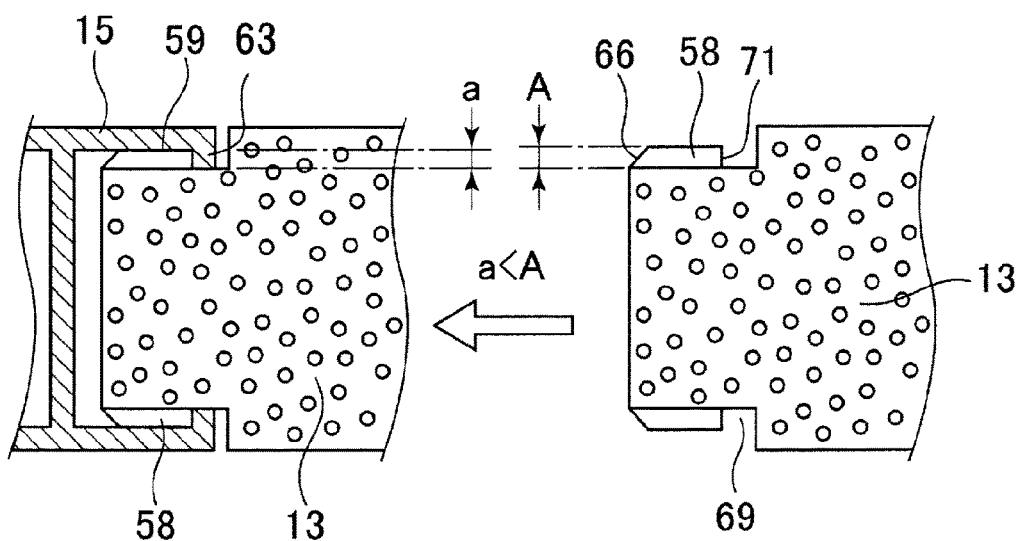
FIG. 11 shows a view similar to FIG. 10 with regard to the sandwich panel according to another example of the present invention.

As illustrated in FIG. 11, the features of the present example involve the shape of the reinforcement member 15 and the corresponding mode of the protuberances 58 of the thermoplastic resin core material 13.

The reinforcement member 15 includes a pair of hook portions 63. The pair of hook portions 63 is formed by bending ends of the reinforcement member 15 on the inner surface side of the recess 50 of the reinforcement member 15, thereby narrowing the opening of the U cross section. The interval between the end surfaces of the pair of hook portions 63 is set so as to be not smaller than the interval between the opposing surfaces 57 of the protrusion 54 and smaller than the interval between the planes 67 of the protuberances 58. Preferably, each of the pair of hook portions 63 may extend throughout in the longitudinal direction of the reinforcement member 15.

With respect to the respective protuberances 58, between an end surface 71 on the root side of the protuberances 58 and the step portion, recesses 69 are provided. Accordingly, when the thermoplastic resin core material 13 is press-fit into the reinforcement member 15, the hook portions 63 are locked in the recesses 69. The recesses 69 have a width equal to or greater than the width of the hook portions 63. In some cases, the width of the recesses 69 may be the same as the width of the hook portions 63 so that the hook portions 63 can fit in the recesses 69.

According to this configuration, when the thermoplastic resin core material 13 is press-fit into the reinforcement member 15, the protuberances 58 are compressively deformed, and the pair of hook portions 63 overrides the corresponding protuberances 58 and becomes hooked in the corresponding recesses 69. In this way, the thermoplastic resin core material 13 can be reliably prevented from falling from the reinforcement member 15. In this case, due to the presence of the pair of hook portions 63, the degree of tight contact of the protuberances 58 with respect to the inner surfaces 56 of the recess 50 may be smaller than that in the case of the previous example.

In this respect, the present example is particularly effective when the thermoplastic resin core material 13 has a high expansion ratio and, as a result, the possible amount of compressive deformation of the protuberances 58 is large.

While examples of the present invention have been described in detail, various modifications or changes may be made by a person skilled in the art without departing from the scope of the present invention.

For example, while the thermoplastic resin core material 13 has been described as being a solid made of foamed resin in the examples, this does not suggest a limitation. The thermoplastic resin core material 13 may be made of simple thermoplastic resin rather than foamed resin, and may be hollow rather than solid, as long as there is the possibility of dimensional tolerance in the thickness direction during molding.

For example, with reference to the examples, it has been described that the plurality of protuberances 58 with which the protrusion 54 of the thermoplastic resin core material 13 is provided is provided to each of the opposing surfaces 57 of the protrusion 54. However, this does not suggest a limitation, and the plurality of protuberances 58 may be provided on one of the opposing surfaces 57 of the protrusion 54, as long as the dimensional tolerance in the thickness direction of the reinforcement member 15 can be absorbed at the time of press-fitting.

For example, in the examples, it has been described that the thermoplastic resin core material 13 is divided into three parts, and that there are provided two reinforcement members 15. However, this does not suggest a limitation, and there may be provided one reinforcement member 15 in accordance with the strength required of the sandwich panel.

For example, in the examples, it has been described that the thermoplastic resin core material 13 has a length equal to or greater than a predetermined length of the reinforcement member 15, and that the reinforcement member 15 is press-fit so as not to protrude from the thermoplastic resin core material 13. However, this does not suggest a limitation, and the thermoplastic resin core material 13 may have a length smaller than the predetermined length of the reinforcement member 15 as long as the thermoplastic resin core material 13 can be strongly press-fit with respect to the reinforcement member 15, and the reinforcement member 15 may protrude from the thermoplastic resin core material 13.

The invention claimed is:

1. A method for manufacturing a resin sandwich panel including a resin core material disposed between two skin material sheets of resin, the method comprising:
   a step of preparing a reinforcement member having a recess formed to extend in a longitudinal direction over a predetermined length and open laterally, and a thermoplastic resin core material including a protrusion capable of being partially press-fit with respect to the recess in a longitudinal direction, the protrusion being disposed on a peripheral side surface portion of the thermoplastic resin core material;
   a step of disposing two thermoplastic resin sheets in molten state between a pair of split molds in such a manner as to extend beyond an annular pinch-off part formed at a peripheral edge portion of a cavity of each of the pair of split molds;
   a step of making the reinforcement member and the thermoplastic resin core material into an integral component by partially press-fitting the protrusion into the recess in the longitudinal direction, and positioning the integral component with respect to the thermoplastic resin sheet; and
   a step of integrating peripheral edge portions of the two thermoplastic resin sheets by welding inner surfaces of the two thermoplastic resin sheets along the pinch-off parts of the pair of split molds by moving the pair of split molds to a clamping position so as to sandwich the integral component between the two thermoplastic resin sheets in molten state, and face-to-face bonding the integral component to the corresponding skin material sheets.

2. The method of claim 1, wherein during the press-fitting the protrusions are compressively deformed to form a contact surface that tightly contacts the inner surfaces of the recess.

3. The method of claim 1, further comprising a step of including an inclined surface or a gradually curved surface at least on a distal end side of the protrusion with which the reinforcement member is press-fit, in a cross-section perpendicular to the longitudinal direction of the reinforcement member.

4. The method of claim 3, further comprising a step of including, on the protrusions, a contact surface tightly contacting the inner surfaces of the recess, the contact surface being formed closer to the peripheral side surface portion from the inclined surface or the gradually curved surface.

5. The method of claim 1, wherein the thermoplastic resin core material has a length equal to or greater than a predetermined length of the reinforcement member, and
   wherein the reinforcement member is press-fit, at an end portion thereof, so as not to protrude from the thermoplastic resin core material.

6. The method of claim 1, further comprising a step of disposing the plurality of protrusions on each of the opposing surfaces.

7. The method of claim 6, wherein the thermoplastic resin core material is a solid integral molded article made from foamed resin,
   wherein the protrusions of one of the opposing surfaces include a contact surface tightly contacting the inner surface on an upper end side of the recess, and the protrusions of the other of the opposing surfaces include a contact surface tightly contacting the inner surface on a lower end side of the recess, the contact surfaces having an interval set so as to be greater than at least an interval between the opposed inner surfaces of the recess, and
   wherein the contact surfaces of the plurality of protrusions have a height and/or area set so as to enable the protrusion to be laterally press-fit with respect to the recess within an expected dimensional tolerance range of thickness of the thermoplastic resin core material.

8. The method of claim 7, further comprising a step of setting the height and area of the contact surfaces of the plurality of protrusions to prevent the protrusion from falling from the recess at a minimum dimensional tolerance, and so as to ensure the press-fitting of the protrusion into the recess at a maximum dimensional tolerance.

9. The method of claim 8, further comprising a step of setting the thickness of the protrusion so that the opposing surfaces do not contact the inner surfaces of the recess at the time of press-fitting of the protrusion into the recess.

10. The method of claim 8, wherein the thermoplastic resin core material is of split type, and
    wherein the reinforcement member includes a first recess with an opening on one side and a second recess with an opening on the other side between adjacent split portions of the thermoplastic resin core material.

11. The method of claim 10, wherein the reinforcement member is an H-shaped extrusion reinforcement, and further comprising a step of:
    setting the opposing surfaces of the protrusion to be lower than the corresponding surfaces of the thermoplastic resin core material so that the thermoplastic resin core material and the reinforcement member become substantially flush when the thermoplastic resin core material is press-fit into the reinforcement member.

12. The method of claim 11, further comprising:
    a step of disposing an abutting surface at a root portion of the protrusion, and
    forming a step with the abutting surface in cooperation with the opposing surfaces so as to abut on a side surface portion on a U-shaped opening portion side of the H-shaped extrusion reinforcement when the thermoplastic resin core material is press-fit into the reinforcement member.

13. The method of claim 12, further comprising a step of forming the opposing surfaces in an inclined shape so that the interval of the opposing surfaces is decreased in a direction away from the abutting surface.

* * * * *